April 23, 1929.  B. MAUVILLIER  1,710,174
AUTOMATIC CLUTCH DEVICE FOR MOTOR VEHICLES AND OTHER APPLICATIONS
Filed July 14, 1925
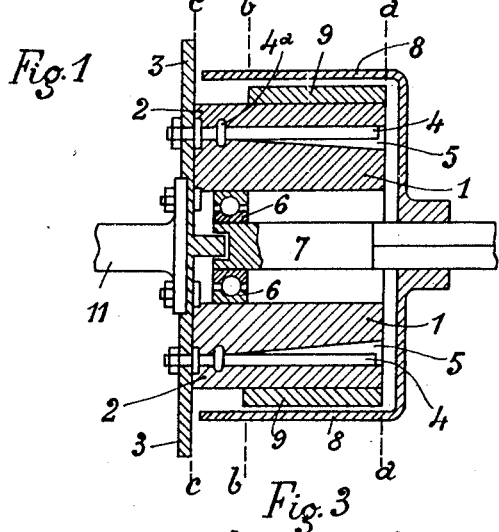
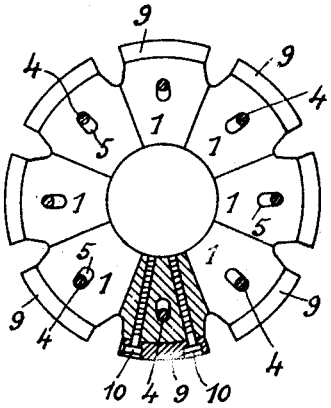
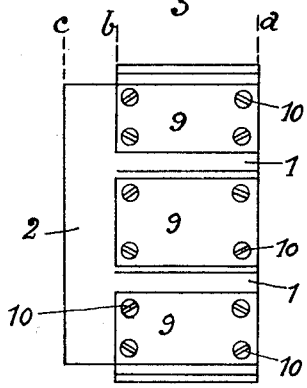
Inventor,
Bernard Mauvillier.
By [signature]
atty.

Patented Apr. 23, 1929.

1,710,174

UNITED STATES PATENT OFFICE.

BERNARD MAUVILLIER, OF CASABLANCA, MOROCCO.

AUTOMATIC CLUTCH DEVICE FOR MOTOR VEHICLES AND OTHER APPLICATIONS.

Application filed July 14, 1925, Serial No. 43,560, and in France March 4, 1925.

My invention relates to an automatic clutch having neither articulation nor spring, which can be advantageously the object of numerous applications in motor vehicles, boats, tool-machines, dynamos starting under a load, starters for motors of all systems and of other mechanical applications.

This clutch is substantially constituted by an expanding ring connected to the driving shaft and placed in the interior of a clutch cup which surrounds the expanding ring and is rigidly connected to the driven shaft.

The expanding ring forms the male part of the clutch and is constituted by a series of radial elements which under the action of centrifugal force move outwards in order to operate in the cup or female part. This action is enhanced by the elasticity of the material itself forming the expanding ring.

When the driving shaft rotates slowly no clutching takes place but as soon as its speed of rotation reaches a predetermined and variable speed according to the application in view, the centrifugal force acting upon the elements of the expanding ring causes the latter to engage the inner face of the clutch cup and to thus produce an automatic clutching effect which operates by itself without the use of pedals or operating levers.

In cases where the apparatus is applied to a motor vehicle, the expanding ring is preferably fixed upon the motor wheel by means of pins when the said ring is made of a plastic material.

The expanding ring elements designed to engage the interior surface of the clutch cup in order to produce the clutching effect are preferably provided with friction plates, such as "ferrodo", inserted between the driving ring and the clutch cup fixed upon the driven shaft.

The appended drawing shows by way of example an automatic clutch device according to the present invention.

Fig. 1 is a longitudinal sectional view showing a clutch in which the expanding ring is of plastic material.

Fig. 2 is a front elevation of the expanding ring separated.

Fig. 3 is a plan view of same.

The clutching device shown in Figs. 1 to 3 comprises a ring or crown made of plastic material such as india rubber, provided with slots extending radially upon the major part of its length in order to constitute the expanding elements or segments 1; the slots extending from $a$—$a$ to $b$—$b$ (Figs. 1 and 3) and the cut-out segments being connected by their inner extremities to a portion 2 which is not slotted and extends from $b$ to $c$. The plane $b$—$b$ where the radial slots terminate thus forms a kind of hinge or articulation for the segments 1.

The elastic ring or crown thus constituted is connected to the motor plate or flywheel 3 by any appropriate means. In the example shown, this connection is ensured by means of pins fixed to the wheel 3 and provided with a thicker part $4^a$ which is forced into and engages in recesses in the portion of the crown which is not provided with slots in order to prevent the whole of the latter from moving longitudinally on said pins.

The elastic segments 1 are provided with egg-shaped openings 5 the section of which increases from plane $b$—$b$ to plane $a$—$a$, Fig. 1, in order to facilitate their radial displacement and in which the pins used for connecting and rotating the expanding ring are engaged. A ball bearing 6 retained in the part 2 of the ring serves to support and center the end of the driven shaft 7 in said ring.

The clutch cup 8 which constitutes the female part of the clutching device is in the present instance of cylindrical shape and keyed upon said shaft.

The elastic segments 1 are advantageously provided on their outer surface with friction plates 9 of "ferrodo" for instance designed to ensure the proper adherence of the segments upon the inner face of cup 8; these plates may be fixed upon the elastic material by any appropriate means such as screws 10 having their heads embedded in the material so as not to project outside.

The operation of the device constructed in the manner which has just been described is as follows:

The motor being started carries along the shaft 11 and consequently the flywheel 3 and the whole of the elastic ring by means of the pins 4.

When the speed is slow or such that it causes only a very slight extension of the segments 1, no clutching of the driven shaft takes place. When the speed increases and reaches a predetermined degree, the segments 1 spread out radially under the effect of the centrifugal force and the ferrodo plates 9 engage strongly the inner face of the clutch cup 8, thus producing the automatic clutching engagement of the two shafts. When the rotation of the driving shaft slows down so as to be under the predetermined speed, the segments 1 by reason of their elasticity come nearer to the centre thus causing automatically the disengagement of the cup 8 and consequently that of the driven shaft.

As will be seen, the device constructed in the manner above described provides a clutching and unclutching apparatus having a thoroughly automatic action and operating without the use of any driving mechanism merely under the action of centrifugal force. It constitutes also a flexible coupling device inserted between the motor shaft and the driven shaft, thus avoiding all jerks in the transmissions, especially when starting.

The present device may be applied advantageously to motor cars either as a clutch in which case it facilitates starting and passing from one speed to another, or as an automatic coupling for electric starter motors. It can also be the object of numerous applications and be used as clutching means for mechanical transmissions.

I claim:

1. In an automatic clutch, a clutching member comprising a slotted ring of rubber to provide a series of segments rigidly connected therewith for engagement by centrifugal force.

2. In an automatic clutch, a clutching member comprising a longitudinally slotted ring of rubber to provide a series of segments integrally connected at one end and whose free ends engage by centrifugal force.

3. In an automatic clutch, a clutching member comprising an expanding ring of rubber longitudinally slotted to form segments at one end of the ring, and friction shoes on the contacting faces of said segments.

4. In an automatic clutch, a driving element comprising a plate, a rubber ring slotted to form segments over a portion of its length, and pins secured in said plate and extending longitudinally of the segments.

5. In an automatic clutch, a driving element comprising a plate, a rubber ring longitudinally slotted a portion of its length to form segments, said segments having longitudinal tapering bores, and pins secured to said plate and extending into said bores.

6. A centrifugal clutch comprising a driving shaft, a driven shaft, a ring of plastic material such as rubber radially slotted for a portion of its length to form extensible segments, friction plates on the external faces of such segments, means to connect said ring to the driving shaft, a cup surrounding the ring and means to connect said cup to the driven shaft.

7. An automatic clutch for motor vehicles and other mechanical applications comprising a driving shaft, a driven shaft, a ring of plastic material such as india rubber slotted radially upon part of its length in a manner to form expanding segments, means to connect said expanding ring to the driving shaft, a clutch cup surrounding said expanding ring and means to connect said cup to the driven shaft.

8. An automatic clutch for motor vehicles and other mechanical applications, comprising: a driving shaft and a driven shaft, a plate carried upon the driving shaft, pins secured to said plate and provided with retaining flanges, a ring of plastic material slotted upon part of its length in such a manner as to constitute expanding segments, longitudinal openings flaring out in the shape of a cone in the whole of the ring to allow the passing through of the pins, recesses formed in said openings to accommodate the retaining flanges of the pins, a clutch cup surrounding said ring and means to connect said cup to the driven shaft.

In testimony that I claim the foregoing as my invention, I have signed my name.

BERNARD MAUVILLIER.